(12) United States Patent
Goto

(10) Patent No.: US 11,451,644 B2
(45) Date of Patent: Sep. 20, 2022

(54) PROXY APPARATUS, COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventor: Fumihide Goto, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/889,856

(22) Filed: Jun. 2, 2020

(65) Prior Publication Data

US 2020/0296180 A1    Sep. 17, 2020

Related U.S. Application Data

(63) Continuation of application No. PCT/JP2018/040482, filed on Oct. 31, 2018.

(30) Foreign Application Priority Data

Dec. 7, 2017   (JP) .............................. JP2017-235292

(51) Int. Cl.
*H04L 67/56* (2022.01)
*H04W 48/16* (2009.01)
(Continued)

(52) U.S. Cl.
CPC ............. *H04L 67/56* (2022.05); *H04W 48/16* (2013.01); *H04W 52/0225* (2013.01); *H04W 84/12* (2013.01)

(58) Field of Classification Search
CPC ..... H04W 8/005; H04W 84/12; H04W 84/18; H04W 48/16; H04W 4/80; H04W 76/14;
(Continued)

(56) References Cited

U.S. PATENT DOCUMENTS 9,575,699 B2   2/2017 Ichikawa et al.
9,686,369 B2   6/2017 Patil et al.
(Continued)

FOREIGN PATENT DOCUMENTS

JP   2014-022808 A   2/2014
JP   2015-130637 A   7/2015
(Continued)

OTHER PUBLICATIONS

"Neighbor Awareness Networking Technical Specification" Version 1.0 by WI-FI Alliance, dated May 1, 2015 (Year: 2015).*

(Continued)

*Primary Examiner* — Daniel Lai
(74) *Attorney, Agent, or Firm* — Venable LLP

(57) ABSTRACT

A proxy apparatus capable of executing proxy processing of at least one of transmission of information of a service provided by a communication apparatus and a search for a service provided by another apparatus for the communication apparatus accepts, from the communication apparatus, a request for execution of a proxy processing, based on communication complying with a NAN (Neighbor Awareness Networking) standard, executes the proxy processing for the communication apparatus based on the request, and confirms, during the active period, based on the communication complying with the NAN standard, whether the communication apparatus can communicate with the proxy apparatus while the proxy apparatus is executing the proxy processing.

29 Claims, 7 Drawing Sheets

(51) Int. Cl.
*H04W 52/02* (2009.01)
*H04W 84/12* (2009.01)

(58) Field of Classification Search
CPC . H04W 84/20; H04W 52/0216; H04W 88/06; H04W 76/10; H04W 56/001; H04W 4/06; H04W 48/18; H04W 4/70; H04W 52/02; H04W 40/244; H04W 48/10; H04W 56/0015; H04W 76/23; H04W 88/04; H04W 88/182; H04W 92/18; H04W 4/08; H04W 72/1278; H04W 76/15; H04W 40/246; H04W 4/00; H04W 72/1205; H04W 74/002; H04W 76/40; H04W 88/02; H04W 8/24; H04W 40/32; H04W 52/0209; H04W 52/0212; H04W 52/0219; H04W 52/383; H04W 56/00; H04W 60/00; H04W 72/121; H04W 76/27; H04W 76/28; H04W 8/22; H04W 24/02; H04W 28/0289; H04W 28/08; H04W 28/12; H04W 36/03; H04W 40/24; H04W 4/23; H04W 72/048; H04W 72/14; H04W 76/20; H04W 76/25; H04W 52/0225; H04L 67/16; H04L 67/28; H04L 67/104; H04L 41/0806; H04L 67/1046; H04L 67/1061; H04L 67/2861; H04L 67/325; H04L 67/1065; H04L 67/1068; H04L 67/1091; H04L 67/141; H04L 67/2809; H04L 67/2876; H04L 67/32; H04L 67/42; H04L 69/08; H04L 67/26; Y02D 30/70

See application file for complete search history.

(56) References Cited

U.S. PATENT DOCUMENTS

| 9,693,217 | B2 | 6/2017 | Kasslin et al. |
| 10,075,837 | B2 | 9/2018 | Aoki et al. |
| 11,184,503 | B2 | 11/2021 | Ichikawa et al. |
| 2015/0081840 | A1 | 3/2015 | Patil et al. |
| 2015/0382301 | A1* | 12/2015 | Huang ............... H04W 52/02 370/311 |
| 2016/0323819 | A1* | 11/2016 | Yang ............... H04W 52/0209 |
| 2016/0352842 | A1* | 12/2016 | Patil ............... H04L 67/303 |
| 2017/0094497 | A1 | 3/2017 | Aoki et al. |
| 2018/0070308 | A1* | 3/2018 | Park ............... H04W 8/005 |
| 2018/0152828 | A1 | 5/2018 | Kasslin et al. |
| 2019/0199815 | A1* | 6/2019 | Park ............... H04L 67/28 |
| 2022/0086305 | A1 | 3/2022 | Ichikawa et al. |

FOREIGN PATENT DOCUMENTS

| JP | 2016-530841 A | 9/2016 |
| JP | 2017-063311 A | 3/2017 |
| JP | 2018-520580 A | 7/2018 |
| WO | 2016/191258 A | 12/2016 |

OTHER PUBLICATIONS

PCT International Search Report and the Written Opinion dated Jan. 29, 2019, in International Application No. PCT/JP2018/040482.
Japanese Office Action dated Jan. 6, 2022, in related Japanese Patent Application No. 2017-235292.
Japanese Office Action dated Aug. 5, 2022 in related Japanese Patent Application No. 2017-235292.

* cited by examiner

PROXY APPARATUS, COMMUNICATION APPARATUS, CONTROL METHOD, AND COMPUTER-READABLE STORAGE MEDIUM

CROSS-REFERENCE TO RELATED APPLICATIONS

This application is a Continuation of International Patent Application No. PCT/JP2018/040482, filed Oct. 31, 2018, which claims the benefit of Japanese Patent Application No. 2017-235292, filed Dec. 7, 2017, both of which are hereby incorporated by reference herein in their entirety.

BACKGROUND OF THE INVENTION

Field of the Invention

The present invention relates to a proxy apparatus, a communication apparatus, a control method, and a computer-readable storage medium and, more particularly, to proxy processing in wireless communication.

Background Art

As a standard for searching for a device or a service provided by the device with low power consumption, there is provided the Wi-Fi® NAN (Neighbor Awareness Networking) standard that is defined by Wi-Fi Alliance®. U.S. Patent Application Publication No. 2015/0081840 describes a technique of extending a service providing area by a proxy station that advertises a providable service or searches for a service as a proxy of a device that actually provides the service or searches for the service.

However, a device that executes the proxy processing cannot determine whether to continue or interrupt proxy processing when a device as the target of the proxy processing moves outside the communicable range of the self-device or disappears due to unintended power supply disconnection. Therefore, by unnecessarily continuing the proxy processing in the device that executes the proxy processing, various resources are unwantedly wasted.

SUMMARY OF THE INVENTION

The present invention prevents a device that executes proxy processing from unnecessarily continuing the proxy processing.

According to one aspect of the present invention, there is provided a proxy apparatus capable of executing proxy processing of at least one of transmission of information of a service provided by a communication apparatus and a search for a service provided by another apparatus for the communication apparatus, comprising: one or more processors; and one or more memories that stores a computer-readable instruction for causing, when executed by the one or more processors, the one or more processors to function as: an acceptance unit configured to accept, from the communication apparatus, a message containing information indicating an active period of the proxy processing while requesting execution of the proxy processing, based on communication complying with a Wi-Fi NAN (Neighbor Awareness Networking) standard; an execution unit configured to execute the proxy processing for the communication apparatus in response to the message; and a confirmation unit configured to confirm, during the active period, based on the communication complying with the Wi-Fi NAN standard, whether the communication apparatus can communicate with the proxy apparatus.

According to another aspect of the present invention, there is provided a communication apparatus comprising: one or more processors; and one or more memories that stores a computer-readable instruction for causing, when executed by the one or more processors, the one or more processors to function as: a request unit configured to request, using a message complying with a Wi-Fi NAN (Neighbor Awareness Networking) standard, a proxy apparatus to execute proxy processing of at least one of transmission of information of a service provided by the communication apparatus and a search for a service provided by another apparatus for the communication apparatus, wherein the message contains at least information indicating an active period of the proxy processing for the communication apparatus executed by the proxy apparatus.

Further features of the present invention will become apparent from the following description of exemplary embodiments with reference to the attached drawings.

DESCRIPTION OF THE EMBODIMENTS

Figure 1:
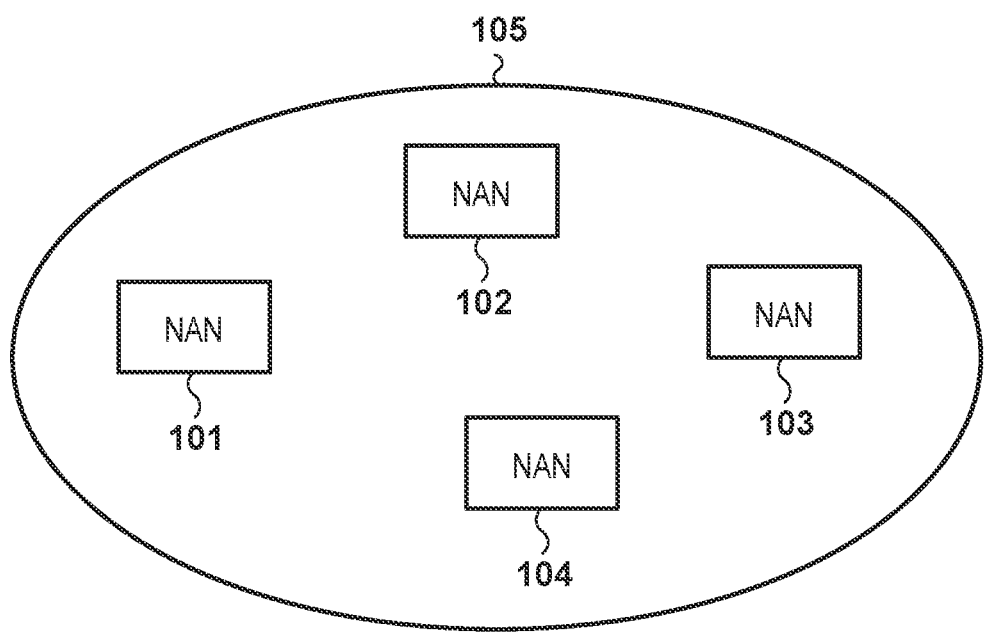
FIG. 1 is a view showing an example of the configuration of a wireless communication system.

An embodiment of the present invention will be described below with reference to the accompanying drawings. The following description assumes that each communication apparatus is an apparatus having the wireless LAN communication function complying with the IEEE802.11 standard series. The present invention, however, is not limited to this. Furthermore, although each communication apparatus to be described below is a NAN device capable of discovering another communication apparatus and a service provided by it in accordance with the Wi-Fi Alliance Neighbor Awareness Networking (NAN) standard, the present invention is not limited to this. The service (to also be referred to as a function, an instance, or the like hereinafter) can be a print service, an information sharing service, an image display service, an image capturing service, or the like but may be another arbitrary service executable by the communication apparatus. In the following description, technical terms corresponding to a predetermined standard are used. However, each discussion to be described below is applicable to other standards of the same type. That is, the following discussions are applicable to standards different from the NAN standard.

A NAN device as a communication apparatus complying with the NAN standard communicates service information during a periodically set period (DW period) called a discovery window (DW). A set of apparatuses which share and synchronize the schedules of DWs (timings of starting DWs) is called a NAN cluster. A plurality of NAN devices belonging to the NAN cluster converge to perform communication using a predetermined frequency channel (channel 6 in the 2.4-GHz band of Wi-Fi®) during the DWs.

Each apparatus belonging to the NAN cluster operates in one of master, non-master sync, and non-master non-sync roles. The apparatus operating in the master role transmits a synchronization beacon (sync beacon) as a beacon for causing each apparatus to identify the DW and synchronize with it. In addition, the apparatus operating in the master role transmits a discovery beacon as a signal for causing an apparatus, which does not belong to the NAN cluster, to recognize the NAN cluster. The discovery beacon is transmitted during a period other than the DW periods for, for example, every 100 TUs (Time Units) (1 TU corresponds to 1,024 μsec). Note that at least one apparatus in each NAN cluster operates in the master role.

The apparatus operating in the non-master sync role transmits not a discovery beacon but a sync beacon. The apparatus operating in the non-master non-sync role transmits neither a sync beacon nor a discovery beacon.

In accordance with information contained in the sync beacon, the apparatus joining the NAN cluster communicates service information during the DW period in synchronous with the DW period set in every predetermined cycle.

More specifically, the apparatuses communicate, with each other, a subscribe message as a signal for searching for or detecting a service provided by another communication apparatus and a publish message as a signal for making a notification of a service provided by the self-apparatus during the DW period. Furthermore, the respective apparatuses can exchange follow-up messages for exchanging additional information about the service during the DW period. Note that the publish, subscribe, and follow-up messages are messages complying with the NAN standard. These messages will collectively be referred to as service discovery frames (SDFs) hereinafter. The respective apparatuses can advertise or detect the service by exchanging the SDFs in accordance with a method complying with the NAN standard.

The NAN device can suppress the power consumption during a period other than the DW periods by entering the DOZE state in which no wireless signal is transmitted/received. In addition, the NAN device can suppress the power consumption even during the DW period by entering the DOZE state. On the other hand, the NAN device cannot transmit/receive the subscribe and publish messages during the DW period when it is in the DOZE state. This may prolong the period until the NAN device detects another NAN device and a service provided by the other NAN device and the period until another NAN device detects a service provided by the NAN device.

To cope with this, some NAN devices can request another NAN device to make a search for and a notification of a service such as subscribe and publish processes of itself. A NAN device that proxy-executes a search for and a notification of a service of another NAN device will be referred to as a proxy server hereinafter. A NAN device that requests another NAN device to proxy-executes a search for and a notification of a service will be referred to as a proxy client hereinafter. The proxy server is an example of a proxy apparatus. If the proxy server accepts a proxy transmission request of the service information from the proxy client, it proxy-transmits the service information provided by the proxy client. If the proxy server accepts a proxy search request of the service information from the proxy client, it proxy-searches for the service information which the proxy client wants to search for. Note that the proxy search indicates processing in which the proxy server proxy-searches for the service information which the proxy client wants to search for, and notifies the proxy client of a search result of the service information.

The proxy client may issue only one or both of the proxy transmission request and proxy search request of the service information to the proxy server. Note that if the proxy client issues both the proxy transmission request and proxy search request of the service information, it may transmit, to the proxy server, individual request signals for the respective requests or one request signal for the two requests. If the proxy client issues a proxy transmission request/proxy search request with respect to a plurality of services, it can transmit an individual request signal for each service. The proxy client may transmit request signals the number of which is smaller than the number of services for which the proxy transmission request/proxy search request is issued, by transmitting one request signal for at least some of the plurality of services.

When the proxy server executes the service search and notification instead of the proxy client, the proxy client need not execute the service search and notification by the self-apparatus. This allows the proxy client to be in the DOZE state for a longer period, thereby reducing the power consumption related to NAN communication. At this time, the proxy client may serve as a service providing apparatus. In this case, while the proxy client is in the DOZE state, the proxy server can transmit the publish message as a proxy of the proxy client in response to reception of the subscribe message transmitted by another NAN device. Therefore, even if the proxy client is in the DOZE state, the NAN device searching for a service can highly probably detect a service provided by the proxy client.

(Configuration of Wireless Communication System)

An example of the configuration of a wireless communication system according to this embodiment will be described with reference to FIG. 1. The wireless communication system according to this embodiment is formed by including NAN devices 101 to 104 as communication apparatuses (NAN devices) each complying with the NAN standard. Assume that the NAN devices 101 to 104 join a common NAN cluster 105. The NAN devices (NAN devices 101 to 104) joining the NAN cluster 105 create a wireless network (cluster) using frequency channel 6 (6 ch) in the 2.4-GHz band. As described above, each of the NAN devices 101 to 104 communicates service information during the DW period set in the NAN cluster 105. The DW periods have a cycle of 16 DW periods of DW0 to DW15. Each DW period is represented by DWn (n is an integer of 0 to 15). Note that after DW15, DWn returns to DW0. Furthermore, DW0 indicates a DW period which starts from the time at which the lower 23 bits of a TSF (Time Synchronization Function) as a timer counter used by the NAN cluster for synchronization become "0x0". All the NAN devices joining the NAN cluster 105 are not in the DOZE state but in the awake state in which they respectively receive wireless signals during at least DW0 without exception. Assume that the NAN cluster 105 is a NAN cluster in which the length of each DW period is 16 TUs, and the time interval from the start timing of a DW period to that of the next DW period is 512 TUs. In this case, the start period of DWn starts when a period of 512×n [TUs] elapses after the start of DW0.

The NAN device 101 is a communication apparatus capable of executing each process to be described below. Based on the NAN standard, the NAN device 101 can detect nearby communication apparatuses and services provided by them, and make a notification of information of a service which can be provided by itself. The NAN device 101 can operate as the proxy client that requests another NAN device to perform proxy processing of a service search and a service notification of another NAN device. Note that the NAN device 101 may be operable as the proxy server that executes proxy processing of a service search of another NAN device and a service notification of the other device in response to a request of proxy processing from the other NAN device. Assume that the NAN device 101 joins the NAN cluster 105 in the non-master non-sync role. In an example, the NAN device 101 has the first mode in which it receives wireless signals during DW0, DW4, DW8, and DW12 and the second mode in which it receives wireless signals during all the DW periods.

The NAN device 102 is a communication apparatus joining the NAN cluster 105 in the master role. The NAN device 102 receives wireless signals during all the DW periods, and transmits sync beacons during all the DW periods. The NAN device 102 can also operate as the proxy server that executes proxy processing in response to a request of the proxy processing of a service search of another NAN device and a service notification of the other NAN device. Note that the NAN device 102 may be operable as the proxy client. However, the NAN device 102 can transition to the DOZE state during some DW periods only after it ends the master role.

The NAN device 103 is a communication apparatus joining the NAN cluster 105 in the non-master non-sync role. Assume that the NAN device 103 serves as a publisher (providing apparatus) that transmits/receives wireless signals during only DW0, and provides a predetermined service which the NAN device 104 is searching for. The NAN device 104 is a communication apparatus joining the NAN cluster 105 in the non-master non-sync role. Assume that the NAN device 104 serves as a subscriber (search apparatus) that is searching for the predetermined service provided by the NAN device 103. Note that each NAN device supplies no power to its communication unit during the DW period in which no wireless signal is transmitted/received, thereby entering the DOZE state.

In this embodiment, the NAN device (NAN device 102) operating as the proxy server performs existence confirmation of the NAN device (NAN device 101) operating as the proxy client. The proxy server acquires, upon receiving a request of proxy processing from the proxy client, information of the active period of the proxy processing. Then, the proxy server can determine whether the proxy client exists by determining whether a predetermined message (for example, a subscribe message) is received from the proxy client within the active period. Note that determination of whether the proxy client exists is determination of whether the proxy client stays within the communicable range of the proxy server in a state in which it is possible to execute communication (by NAN, for example). Thus, if, for example, the proxy client leaves the communicable range of the proxy server or the power supply is suddenly disconnected, the proxy server cannot receive an existence confirmation signal of the proxy client. Therefore, the proxy server can end the proxy processing with respect to the proxy client whose existence is not confirmed.

Examples of the arrangement of the apparatus and the procedure of processing will be described below.

(Arrangement of NAN Device)

Figure 2:
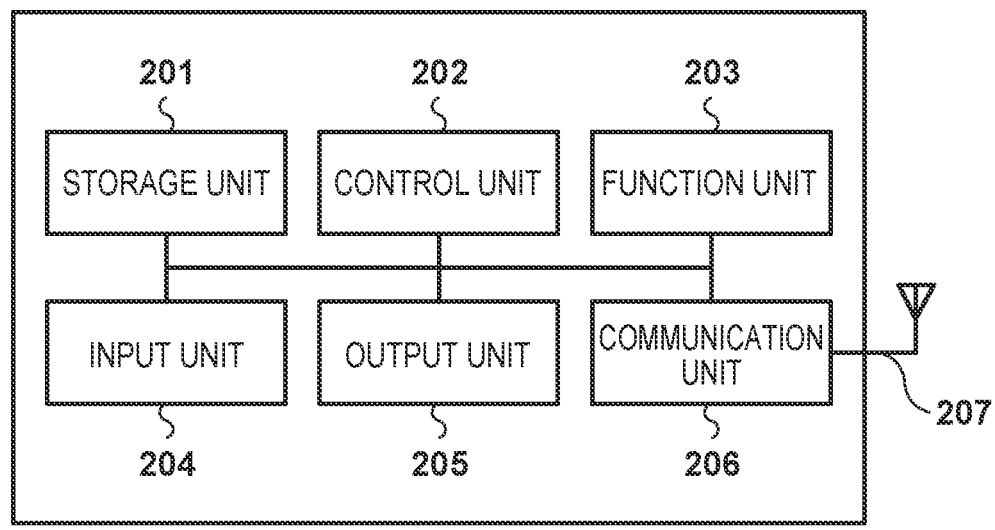
FIG. 2 is a block diagram showing an example of the hardware arrangement of a NAN device.

FIG. 2 shows the hardware arrangement of the NAN devices 101 and 102 according to this embodiment. Note that the remaining apparatuses (the NAN devices 103 and 104) can have the same hardware arrangement. Each NAN device includes, as an example of a hardware arrangement, a storage unit 201, a control unit 202, a function unit 203, an input unit 204, an output unit 205, a communication unit 206, and an antenna 207.

The storage unit 201 is formed by one or more memories of one or both of a ROM and a RAM, and stores programs for executing various operations (to be described later), and various kinds of information such as communication parameters for wireless communication. Here, ROM is an abbreviation for Read Only Memory, and RAM is an abbreviation for Random Access Memory. Note that instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 201.

The control unit 202 is formed by one or more processors such as a CPU or MPU, and controls the overall NAN device by executing the programs stored in the storage unit 201. Here, CPU is an abbreviation for Central Processing Unit, and MPU is an abbreviation for Micro-Processing Unit. Note that the control unit 202 may control the overall NAN device in cooperation with an OS (Operating System) and the programs stored in the storage unit 201.

The control unit 202 controls the function unit 203 to execute predetermined processing such as image capturing, printing, and projection. The function unit 203 is hardware used by the NAN device to execute the predetermined processing. If, for example, the NAN device is a camera, the function unit 203 serves as an image capturing unit, and performs image capturing processing. If, for example, the NAN device is a printer, the function unit 203 serves as a printing unit, and performs print processing. If, for example, the NAN device is a projector, the function unit 203 serves as a projection unit, and performs projection processing. Data processed by the function unit 203 may be data stored in the storage unit 201 or data communicated with another NAN device via the communication unit 206 (to be described later).

The input unit 204 accepts various operations from the user. The output unit 205 performs various kinds of output operations to the user. The output from the output unit 205 includes at least one of display on a screen by a display unit, a voice output from a loudspeaker, a vibration output, and the like. Note that both of the input unit 204 and the output unit 205 may be implemented by one module like a touch panel.

The communication unit 206 controls wireless communication complying with the IEEE802.11 standard series, and particularly controls wireless communication complying with the NAN standard and IP communication. The communication unit 206 transmits/receives a wireless signal for wireless communication via the antenna 207. The NAN device communicates a content such as image data, document data, or video data with another NAN device using the communication unit 206.

Figure 3:
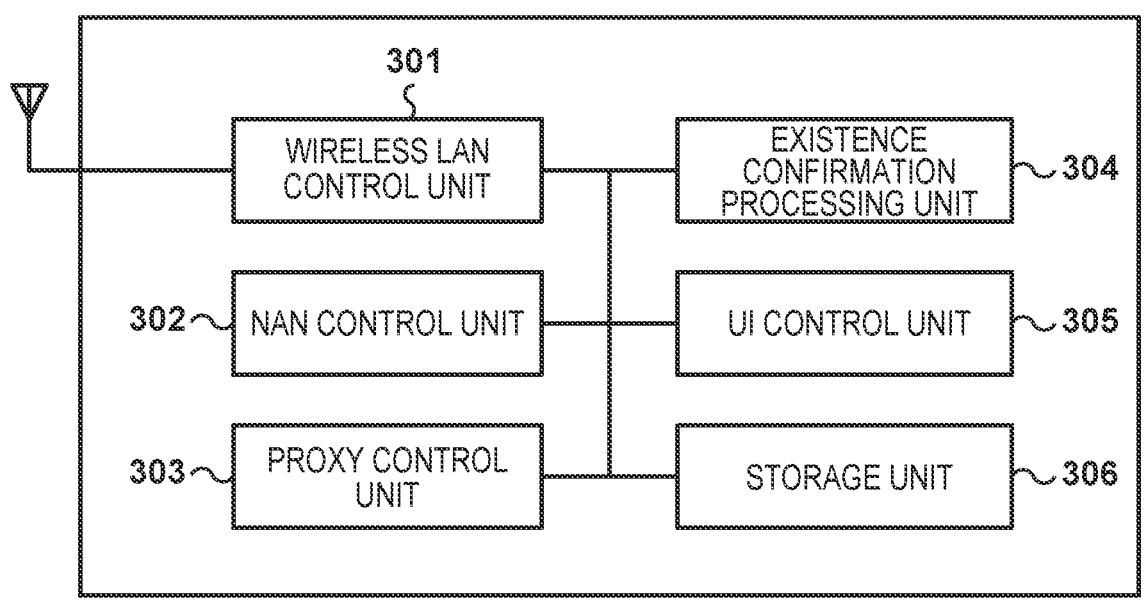
FIG. 3 is a block diagram showing an example of the functional arrangement of the NAN device.

FIG. 3 is a block diagram showing an example of the functional arrangement of the NAN devices 101 and 102. Each NAN device includes, as a functional arrangement, for example, a wireless LAN control unit 301, a NAN control unit 302, a proxy control unit 303, an existence confirmation processing unit 304, a UI control unit 305, and a storage unit 306.

The wireless LAN control unit 301 is formed by including an antenna for transmitting/receiving a wireless signal to/from another wireless LAN apparatus, a circuit, and a program for controlling the antenna and circuit. The wireless LAN control unit 301 executes wireless LAN communication control in accordance with the IEEE802.11 standard series. The NAN control unit 302 is formed by including hardware and a program for performing control in accordance with the NAN standard. When the NAN device operates as the proxy server, the proxy control unit 303 controls the NAN control unit 302 to implement a proxy function of proxy-executing the service search and notification of another NAN device. When, for example, the NAN device operates as the proxy client, the proxy control unit 303 executes processing for requesting another apparatus operating as the proxy server to execute proxy processing.

When the NAN device requests, as the proxy client, another apparatus to execute proxy processing, the existence confirmation processing unit 304 sets the active period of the request. In this case, for example, the existence confirmation processing unit 304 can execute control to contain information of the set active period in a proxy register request message as a signal for requesting the proxy processing. This can notify the proxy server of the active period, and cause the proxy server to execute existence confirmation processing (to be described later). Note that the active period may be variable or fixed. In addition, the active period may be indicated as an indefinite period by making no notification of the active period. On the other hand, when the NAN device receives, as the proxy server, a request of proxy processing from another apparatus, the existence confirmation processing unit 304 stores and manages information of the active period of the request of the proxy processing based on, for example, the received signal. Then, the existence confirmation processing unit 304 executes existence confirmation of the proxy client based on the information of the active period. Note that the existence confirmation processing unit 304 may acquire, for example, information of a DW period in which the proxy client is in the awake state or the DOZE state. In this case, the existence confirmation processing unit 304 can perform existence confirmation during the DW period in which the proxy client is in the awake state without performing existence confirmation during the DW period in which the proxy client is in the DOZE state. Details of these processes will be described later.

The UI control unit 305 is formed by including hardware related to a user interface such as a touch panel or button for accepting an operation for the NAN device 101 by the user (not shown) of the NAN device 101, and a program for controlling the hardware. Note that the UI control unit 305 also has, for example, a function for presenting information to the user, such as a function of displaying an image or the like or a function of outputting a voice. The storage unit 306 is a storage device which can be formed by a ROM, a RAM, and the like and saves data and programs operated by the NAN device 101.

(Procedure of Processing)

Subsequently, the procedure of the above-described processing executed in the wireless communication system will be described with reference to FIG. 4.

Figure 4:
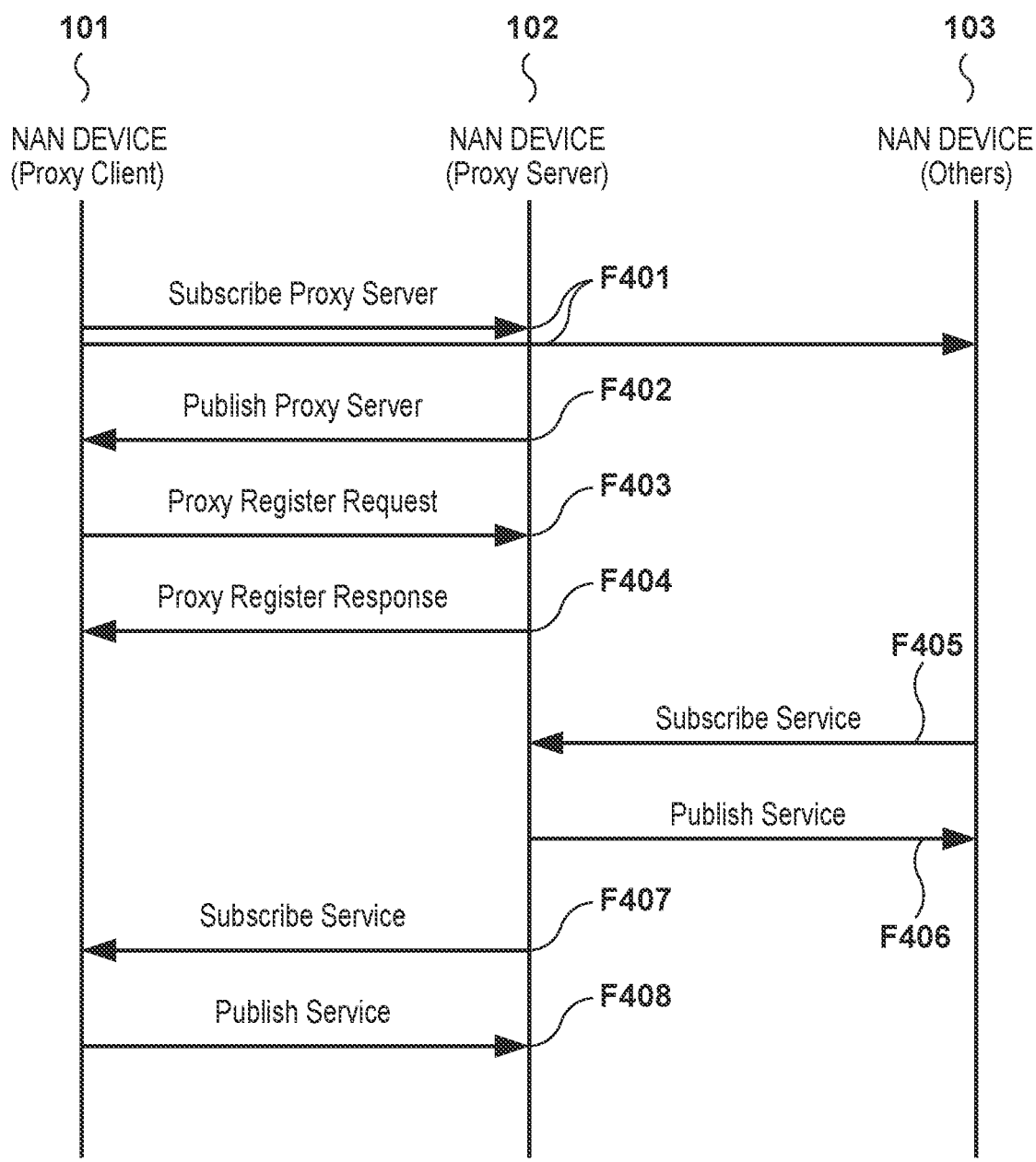
FIG. 4 is a sequence chart showing the procedure of processing executed in the wireless communication system.

FIG. 4 is a sequence chart showing an example of the operation of the wireless communication system when the NAN device 101 operates as the proxy client and the NAN device 102 operates as the proxy server. In this example, an example of the procedure of processing in which the NAN device 101 operating as the proxy client searches for the NAN device 102 serving as the proxy server and requests proxy processing will be described. Note that when the processing shown in FIG. 4 starts, the NAN device 101 operates in the second mode in which it receives wireless signals during all the DW periods.

The NAN device 101 transmits a subscribe message for searching for a proxy server (a device that is executing a service of the proxy server) (F401). Note that the subscribe message will be simply referred to as the "subscribe" hereinafter. Assume that the subscribe is transmitted during the DW period. The present invention, however, is not limited to this. The subscribe may be transmitted at a timing during a period other than the DW period, of which the NAN device is notified in advance during the DW period. The NAN device 101 can transmit the subscribe to a plurality of NAN devices belonging to the same cluster by multicast or broadcast. Note that the NAN device 101 may repeat transmission of the subscribe by unicast to an individual apparatus. The NAN device 101 may transmit the subscribe by broadcast to a plurality of networks (including a NAN cluster different from the NAN cluster 105).

Upon receiving the subscribe, the NAN device 102 functioning as the proxy server transmits a publish message to the NAN device 101 as the transmission source of the subscribe (F402). Note that the publish message will be simply referred to as the "publish" hereinafter. Assume that the publish is transmitted during the DW period. The present invention, however, is not limited to this. The publish may be transmitted at a timing during a period other than the DW period, of which the NAN device is notified in advance during the DW period. The NAN device 102 can transmit the publish to the NAN device 101 by unicast. The present invention, however, is not limited to this. The NAN device 102 may transmit the publish to a plurality of NAN devices belonging to the same cluster by multicast or broadcast. The NAN device 102 may transmit the publish by broadcast to a plurality of networks (including a NAN cluster different from the NAN cluster 105). Furthermore, the NAN device 102 may periodically transmit the publish regardless of whether it receives the subscribe. In this case, the NAN device 101 need not transmit the subscribe in F401.

Figure 5:
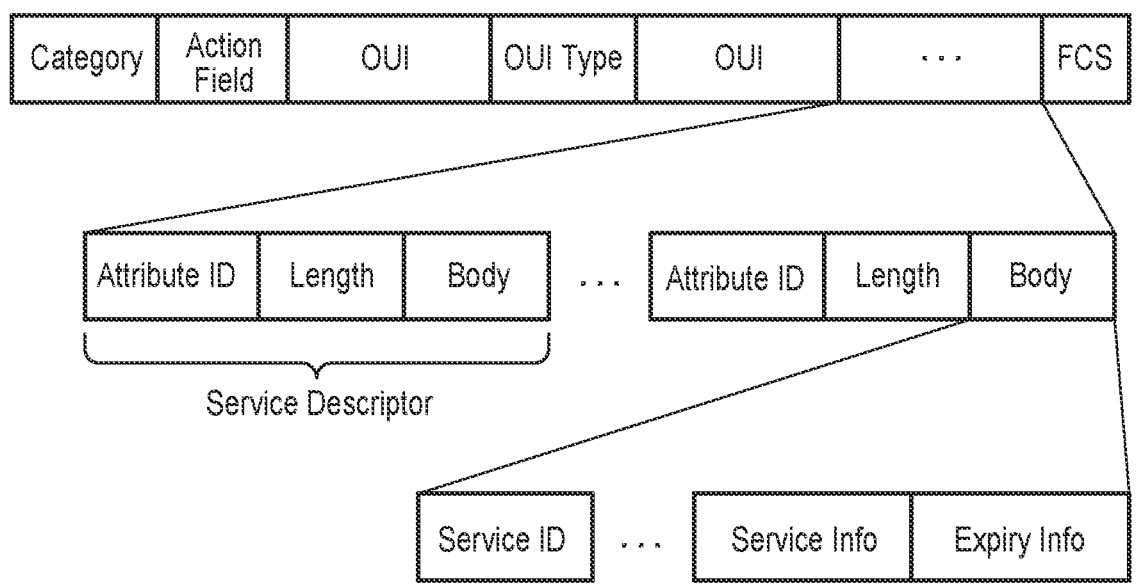
FIG. 5 is a view showing an example of the structure of a proxy register request.

The NAN device 101 can know that the NAN device 102 is executing the service of the proxy server by receiving the publish. Then, the NAN device 101 requests the NAN device 102 to proxy-transmit service information. For example, the NAN device 101 transmits a proxy register request message complying with the NAN standard, which is a registration request message for requesting proxy transmission of the service (F403). Note that the proxy register request message will be simply referred to as the "proxy register request" hereinafter. FIG. 5 shows an example of the frame structure of the proxy register request. The proxy register request can be transmitted during the DW period. This can suppress the power consumption of the NAN device 101 operating as the proxy client and that of the NAN device 102 operating as the proxy server. The proxy register request may be transmitted at a timing during a period other than the DW period, of which the NAN device is notified in advance during the DW period. Furthermore, based on a communication status during the DW period and the number of devices joining the NAN cluster 105, a timing during the DW period or a timing during a period other than the DW period may be determined as a timing at which the proxy register response is transmitted. This enables the NAN device to request proxy transmission of the service information at an appropriate timing according to a network status while suppressing the power consumption of itself and that of the partner apparatus.

Upon receiving the proxy register request from the NAN device 101, the NAN device 102 analyzes contents of the message, and determines whether the self-apparatus can execute the requested proxy transmission. Then, if the NAN device 102 can execute the proxy transmission, it transmits, to the NAN device 101, a proxy register response message indicating that the requested proxy transmission is executable (F404). Note that the proxy register response message will be simply referred to as the "proxy register response" hereinafter. In response to transmission of the proxy register response (for example, immediately after transmission or after a predetermined time period elapses since transmission), the NAN device 102 starts the proxy processing. Note that if the NAN device 102 determines that the proxy transmission requested by the proxy register request received from the NAN device 101 is not executable, it can transmit a proxy register response containing negative contents. For example, the NAN device 102 can transmit, to the NAN device 101, a proxy register response indicating an error or indicating that the proxy transmission is not executable.

If the NAN device 102 determines that the proxy transmission is not executable, it may transmit no response. In this case, since transmission of the proxy register response implicitly indicates that the proxy processing is executable, explicit information indicating that the proxy processing is executable need not be added to the proxy register response.

If, for example, the processing load (the use amount of the processor or memory, or the like) of the proxy processing (for example, the proxy transmission or proxy search) is heavier than a predetermined threshold, the NAN device 102 can determine that the proxy processing is not executable. Alternatively, the NAN device 102 may determine whether the proxy processing is executable, in accordance with a setting, by, for example, a user instruction or the like, of whether the proxy processing by itself is permitted or whether the proxy processing of the NAN device 101 is permitted.

Note that the proxy register response can be transmitted during the DW period. This can suppress the power consumption of the NAN device 101 operating as the proxy client and that of the NAN device 102 operating as the proxy server. The proxy register response may be transmitted at a timing during a period other than the DW period, of which the NAN device is notified in advance during the DW period. Furthermore, based on the communication status during the DW period and the number of devices joining the NAN cluster 105, a timing during the DW period or a timing during a period other than the DW period may be determined as a timing at which the proxy register response is transmitted. This enables the NAN device to respond to the request of the proxy transmission of the service information at an appropriate timing according to the network status while suppressing the power consumption of itself and that of the partner apparatus.

Upon receiving, from the NAN device 102, the proxy register response indicating that the proxy transmission is executable, the NAN device 101 can notify the user via the output unit 205 that the proxy transmission starts. After transmitting the proxy register response indicating that the proxy transmission is executable, the NAN device 102 can notify the user via the output unit 205 of the NAN device 102 that the proxy transmission has started. Furthermore, each of the NAN devices 101 and 102 may notify an application within the apparatus, which uses a search for or transmission of the service information, that the proxy transmission has started. This enables the application to perform processing corresponding to the start of the proxy transmission.

Upon receiving the proxy register response indicating the proxy transmission is executable, the NAN device 101 can switch the operation mode from the second mode to the first mode. That is, the NAN device 101 can transition from the state in which it receives wireless signals during all the DW periods to the state in which it receives wireless signals during some DW periods. This enables the NAN device 101 to extend the period in which the communication unit 206 is in the DOZE state, thereby further reducing the power consumption. Therefore, it is possible to reduce the power consumption of the NAN device 101. Note that the NAN device may switch the operation mode by using, as a trigger, an operation other than reception of the proxy register response. For example, the NAN device 101 can switch the operation mode from the second mode to the first mode in response to transmission of the proxy register request. Furthermore, if the NAN device 101 transmits the publish for making a notification of the service information of itself, it may stop the transmission of the publish in response to reception of the proxy register response indicating that the proxy transmission is executable. Since this reduces a transmitted signal amount, the NAN device 101 can reduce the power consumption related to communication complying with the NAN standard, thereby accordingly reducing the power consumption of the overall apparatus.

In the state in which the NAN device 102 starts the proxy transmission of the service information, the NAN device 103 transmits the subscribe to perform the service search (F405). In response to the subscribe, the NAN device 102 transmits the publish for making a notification of the service information requested by the NAN device 101 together with contents of the service provided by the NAN device 102 (F406). This enables the NAN device 103 to know the service executed by the NAN device 101 even if the NAN device 101 transmits no publish to the subscribe because, for example, it is in the DOZE state.

Note that the proxy transmission of the service has been explained here. However, the proxy search for the service can be executed by the same sequence. In this case, the NAN device 102 transmits the subscribe, and receives the publish from another NAN device (for example, the NAN device 103) that provides the service. Note that if the other NAN device that provides the service periodically transmits the publish regardless of the presence/absence of reception of the subscribe, the NAN device 102 need not transmit the subscribe. In either case, if the NAN device 102 receives the publish, it notifies the NAN device 101 of the service information contained in the publish at an appropriate timing. Note that the appropriate timing can be a timing during the next DW period of a timing at which the publish is received. The present invention, however, is not limited to this. For example, as will be described later, the NAN device 102 may recognize the DW period in which the NAN device 101 is in the awake state, and may be prevented from notifying the NAN device 101 of the information during the DW period in which the NAN device 101 is in the DOZE state. In this way, the NAN device 101 can acquire the service information provided by the other NAN device.

In the above description, the NAN device 101 may stop the transmission of the publish in response to reception of the proxy register response indicating that the proxy transmission is executable. This can be applied to the subscribe. That is, if the NAN device 101 transmits the subscribe, it can stop the transmission of the subscribe in response to reception of the proxy register response indicating that the proxy search is executable. Since this reduces a transmitted signal amount, the NAN device 101 can reduce the power consumption related to communication complying with the NAN standard, thereby reducing the power consumption of the overall apparatus.

In this embodiment, the NAN device 102 operating as the proxy server transmits the subscribe to the NAN device 101 operating as the proxy client (F407). This is performed on the side of the NAN device 101 while the NAN device 102 executes the proxy processing for the NAN device 101 in order to confirm that an event such as movement to the outside of the communicable range of the NAN device 101 or power supply disconnection has not occurred, that is, in order to perform existence confirmation. More specifically, in this embodiment, the NAN device 102 executes existence confirmation processing based on the active period of the service information concerning the request of the proxy processing from the NAN device 101. For example, the NAN device 102 specifies the active period of the proxy processing based on the active period information (Expiry Info in FIG. 5) contained in the proxy registration request in F403. Note that if the proxy registration request contains no active period information or Expiry Info indicates an indefinite period, the NAN device 102 can deal with the proxy processing as processing having no active period. Note that the NAN device 102 may execute the existence confirmation processing based on the cycle information of the DW period in which the proxy client (NAN device 101) is in the awake state together with the active period information. That is, the NAN device 102 can execute existence confirmation of the NAN device 101 during the DW period in which the NAN device 101 is in the awake state within the active period. Note that information concerning at least one of the DW period in which the NAN device 101 is in the awake state and the DW period in which the NAN device 101 is in the DOZE state can be contained in the subscribe in F401 or the proxy register request in F403. In addition, the NAN device 101 may notify the NAN device 102 of this information by another message or the like. Upon receiving the publish from the NAN device 101 (F408), the NAN device 102 can confirm the existence of the NAN device 101.

Figure 6:
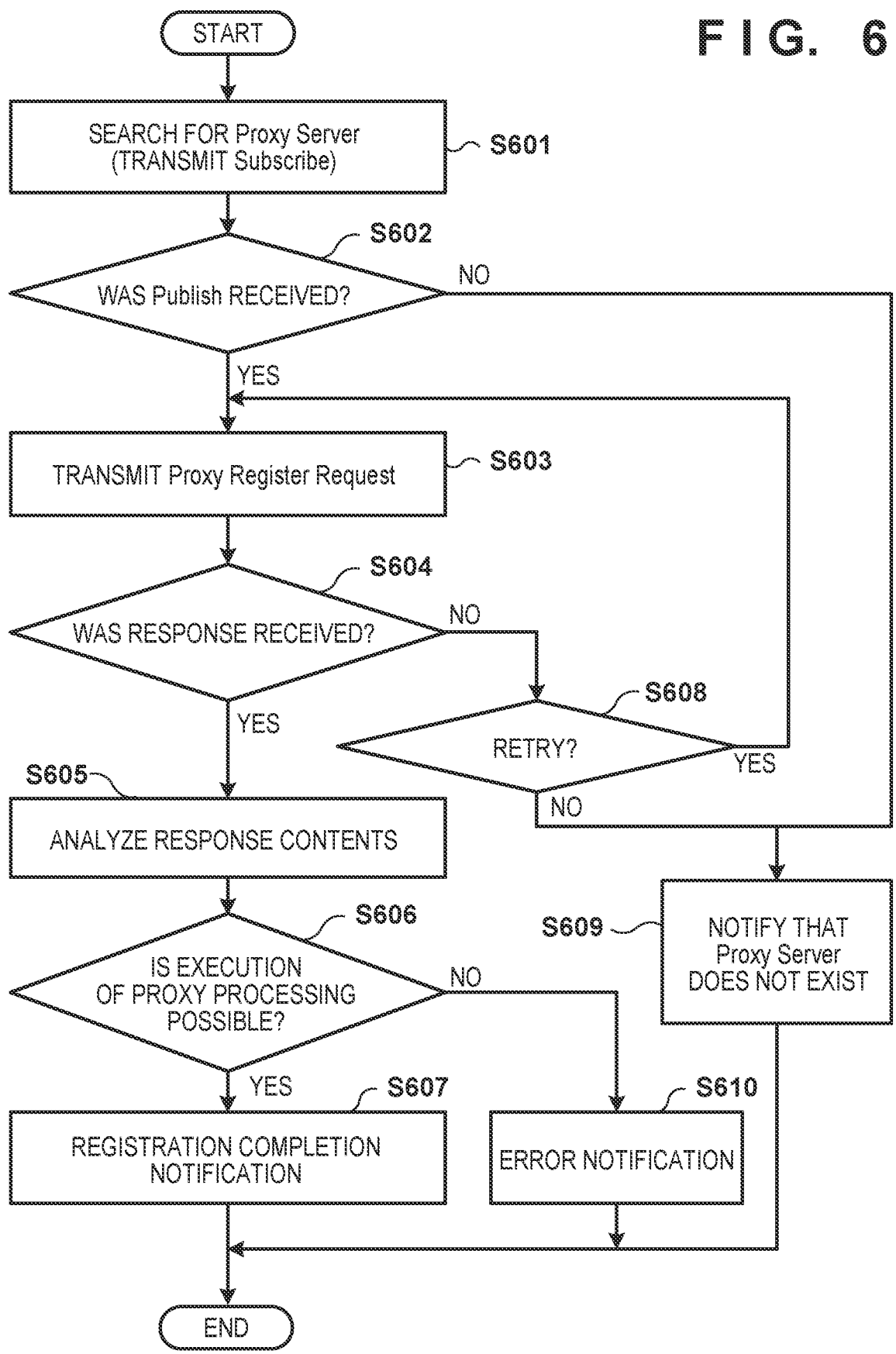
FIG. 6 is a flowchart implemented by a proxy client.

An example of the procedure of processing executed by the proxy client (NAN device 101) will be described with reference to FIG. 6. In this processing, the NAN device 101 detects another NAN device functioning as the proxy server, and requests proxy processing, thereby registering information of itself in the proxy server. Note that this processing can be implemented when the control unit 202 of the NAN device 101 reads out the program stored in the storage unit 201 of the NAN device 101 and executes it. However, part or all of the processing may be implemented by, for example, hardware such as an ASIC.

In this processing, the NAN device 101 starts to search for another NAN device operating as the proxy server (step S601). The search for the proxy server is performed by an active method or a passive method. In the active method, the NAN device 101 transmits a subscribe as a search signal for searching for an apparatus capable of executing a proxy processing service. Then, the NAN device 101 receives a publish as a response to the subscribe, and can detect the proxy server as the transmission source of the publish. The publish transmitted from the proxy server contains information indicating that the proxy processing service is executable. In the passive method, the NAN device operating as the proxy server periodically transmits a publish regardless of whether it receives a subscribe. Therefore, the NAN device 101 waits for the publish without transmitting the subscribe. In either method, the NAN device 101 waits for the publish from the proxy server. Note that the NAN device 101 can be configured to wait for the publish only during the DW periods and not to wait for the publish during a period other than the DW periods by entering the DOZE state.

If, as a result of waiting for the publish for a predetermined time period, the NAN device 101 receives no publish (NO in step S602), it sends an absence notification indicating that the proxy server capable of executing the proxy processing does not exist (step S609). This absence notification is made by, for example, screen display or voice output to the user via the output unit 205. Note that in addition to this, the NAN device 101 may internally make an absence notification to the application that uses the service information by NAN communication. Even if the publish is received, if the publish indicates that a request of new proxy processing is not accepted, the NAN device 101 advances the process to step S609. Note that if the NAN device 101 makes an absence notification, it may restart the processing from step S601 when a user operation is performed or a predetermined condition is satisfied. Note that examples of the predetermined condition are a condition that a predetermined time is reached, a condition that the NAN device 101 belongs to or leave a predetermined position or range, and a condition that the NAN device 101 belongs to a new cluster.

On the other hand, the NAN device 101 can detect the proxy server by receiving the publish (YES in step S602). Assume that the NAN device 101 detects the NAN device 102 as the proxy server. In this case, the NAN device 101 transmits a proxy register request to the NAN device 102 (step S603). The proxy register request contains service information (instance information) concerning the proxy processing (proxy transmission or proxy search) of a service requested by the NAN device 101. Note that the NAN device 101 may transmit the proxy register request before the predetermined time period used in step S602 or another given time period elapses since reception of the publish.

After transmitting the proxy register request, the NAN device 101 waits for a response message from the NAN device 102 (step S604). Note that the response message can be a proxy register response. Note that if, for example, the NAN device 101 receives no response message before the predetermined time period in step S602 or the other given time period elapses (NO in step S604), it determines whether to retransmit the proxy register request (step S608). Note that for example, depending on whether the number of times of transmission of the proxy register request exceeds a predetermined value, the NAN device 101 determines whether to make a retry. Alternatively, depending on whether the number of times of determination in step S604 or S608 exceeds a predetermined value, the NAN device 101 may determine whether to make a retry. Note that the predetermined value may be determined in accordance with the application executed by the NAN device 101 or may be set by the user. If the NAN device 101 determines to retransmit the proxy register request (YES in step S608), it returns the process to step S603, and retransmits the proxy register request (step S603). On the other hand, if the NAN device 101 determines not to retransmit the proxy register request (NO in step S608), it makes an absence notification indicating that the proxy server capable of executing the proxy processing does not exist (step S609). Note that instead of or in addition to the absence notification, the NAN device 101 may send an error notification indicating that the request of the proxy processing to the proxy server capable of executing the proxy processing has failed.

Upon receiving the response message from the NAN device 102 after transmitting the proxy register request (YES in step S604), the NAN device 101 analyzes contents of the received proxy register response (step S605). By, for example, analyzing the contents, the NAN device 101 determines whether the received proxy register response indicates that the proxy processing requested in step S603 is executable or not (step S606).

If the proxy register response indicates that the requested proxy processing is executable (YES in step S606), the NAN device 101 notifies the user via the output unit 205 that the proxy processing has started (step S607). At this time, at the time of making the notification of the start of the proxy processing, the NAN device 101 may also notify the user of information concerning the NAN device 102 that performs the proxy processing. The NAN device 101 may internally make a notification (service information registration completion notification) of the start of the proxy processing to the application that uses the transmission or search of the service information. On the other hand, if the proxy register response indicates that the requested proxy processing is not executable (NO in step S606), the NAN device 101 notifies the user of an error (step S610). For example, the NAN device 101 makes a notification of an error indicating that the request of the proxy processing to the proxy server capable of executing the proxy processing has failed. Note that if the proxy register response contains additional information, the NAN device 101 may also notify the user of the additional information. The additional information includes, for example, a reason why the proxy processing is not executable.

Note that in step S603, the NAN device 101 may transmit a proxy deregister request for requesting to end the proxy processing instead of the proxy register request for requesting to execute the proxy processing. In this case, it is determined in steps S605 and S606 whether the NAN device 102 deletes registered information, and a deletion completion notification can be executed in step S607.

Figure 7:
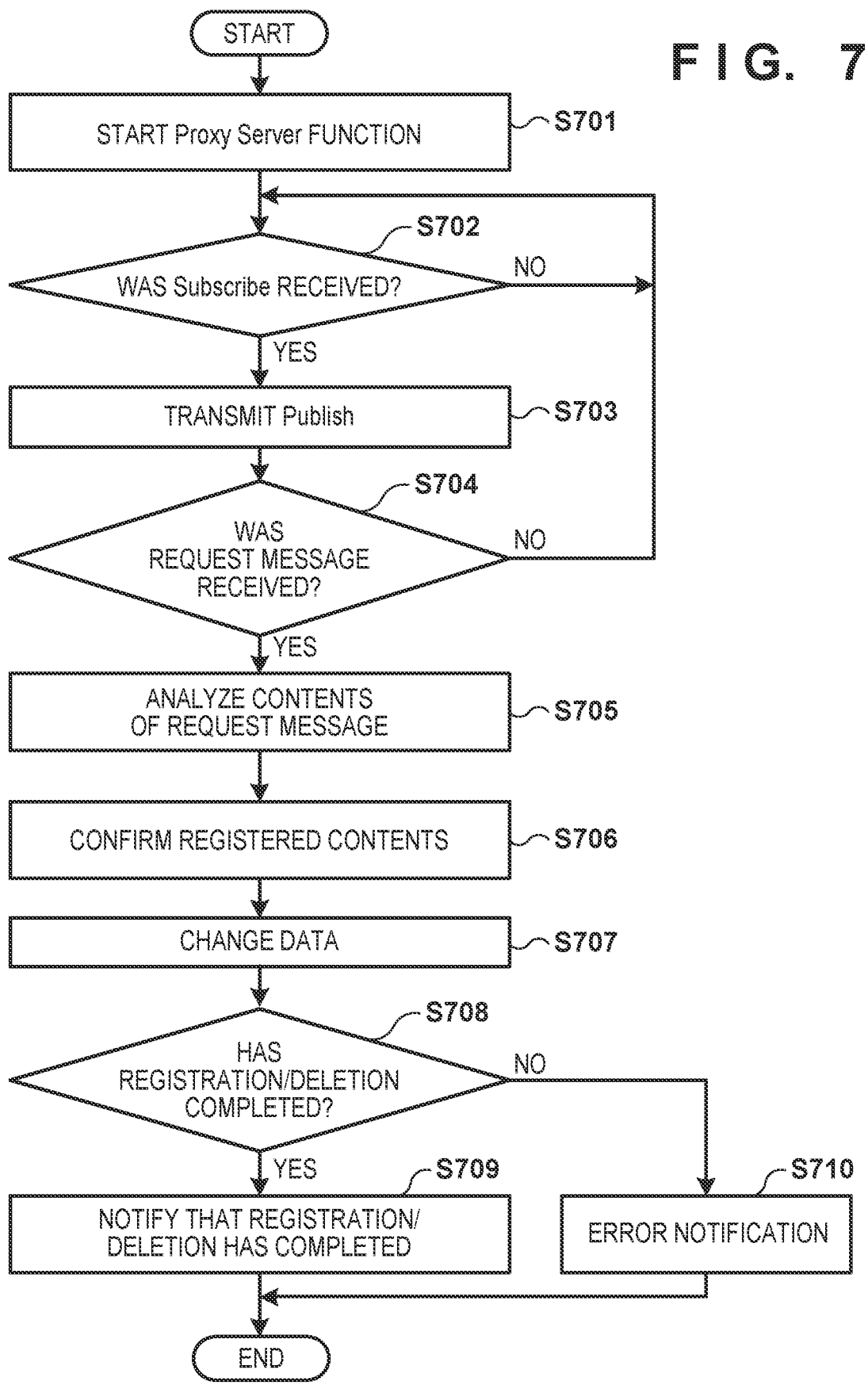
FIG. 7 is a flowchart implemented by a proxy server.

Subsequently, an example of the procedure of processing executed by the proxy server (NAN device 102) will be described with reference to FIG. 7. In this processing, the NAN device 102 accepts registration of information from another NAN device functioning as the proxy client. Note that this processing can be implemented when the control unit 202 of the NAN device 102 reads out the program stored in the storage unit 201 of the NAN device 102 and executes it. However, part or all of the processing may be implemented by, for example, hardware such as an ASIC. When, for example, the user turns on a NAN communication function, the NAN device 102 starts the processing shown in FIG. 7. The present invention, however, is not limited to this. When the user instructs to start the proxy processing, the processing may start. Alternatively, the processing shown in FIG. 7 may start when a predetermined condition is satisfied, for example, when a predetermined time is reached, when the NAN device 102 belongs to or leaves a predetermined position or range, or when the NAN device 102 belongs to a new cluster. Note that the predetermined time can include a time obtained as a result of measuring a lapse of a predetermined time period. When the power is turned on or when the power supply is switched from a battery to a commercial power supply, the NAN device 102 may start the processing shown in FIG. 7.

The NAN device 102 starts a function as the proxy server (step S701). Then, in response to, for example, reception of the subscribe from the NAN device 101 (YES in step S702), the NAN device 102 transmits the publish (step S703). Note that if the NAN device 102 is configured to transmit the publish regardless of the presence/absence of the subscribe, the processing in step S702 may be skipped. Even if the NAN device 102 is configured to transmit the publish regardless of the presence/absence of the subscribe, the NAN device 102 may further transmit the publish in response to reception of the subscribe.

The publish transmitted in step S703 can contain service information of the print/image capturing service or the like provided by the NAN device 102, and information indicating that a proxy server service is provided. The publish is transmitted, by broadcast, multicast, or unicast, to the remaining NAN devices in the NAN cluster 105 which the NAN device 102 joins. Note that the publish may be transmitted to a plurality of clusters including another cluster different from the NAN cluster 105. The publish is transmitted during the DW period of the cluster which the NAN device 102 joins. The present invention, however, is not limited to this. The publish may be transmitted at a timing during a period other than the DW period, of which the NAN device is notified in advance during the DW period.

Note that if the NAN device 102 provides a proxy processing function but cannot temporarily accept new proxy processing, additional information indicating that acceptance of new proxy processing is stopped may be added to the publish. In this case, the NAN device 102 does not execute the processes in step S704 and subsequent steps, and can repeat the processes in steps S702 and S703 until it becomes possible to accept new proxy processing. Note that the NAN device 102 may notify the user of an error, and end the processing shown in FIG. 7.

After step S703, the NAN device 102 waits for a request message concerning the proxy processing from the proxy client (NAN device 101) (step S704). The request message concerning the proxy processing can be a proxy register request for requesting to execute the proxy processing or a proxy deregister request for requesting to end the proxy processing. The NAN device 102 continues the processes in steps S702 and S703 until a request message is received (NO in step S704). Note that if the NAN device 102 executes the processes in steps S702 and S703 a predetermined number of times, the processing shown in FIG. 7 may end.

Upon receiving the request message (YES in step S704), the NAN device 102 confirms contents of the request message (step S705). The NAN device 102 confirms, for example, whether the received request message is the proxy register request for requesting to execute the proxy processing or the proxy deregister request for requesting to end the proxy processing. In addition, the NAN device 102 confirms whether the request message is related to proxy transmission or a proxy search, or is related to any services.

Then, the NAN device 102 confirms contents of the proxy processing executed by itself (step S706). If the self-apparatus executes the proxy processing by receiving a request from another device, the NAN device 102 can register contents in itself, and execute the proxy processing in accordance with the contents. Therefore, the NAN device 102 can execute the confirmation processing in step S706 by confirming the contents of the processing registered in itself. If the contents of the proxy processing designated by the request message are not registered, the NAN device 102 registers service information (the contents, the active period, and the like of the proxy processing of the service transmission/service search and the like) designated by the request message (step S707). If the service information designated by the request message is different from the registered service information, the NAN device 102 can update/change the registered contents.

A case in which the NAN device 101 requests the NAN device 102 to perform proxy transmission of the print service will now be described. In this case, the NAN device 102 confirms whether it is already executing the proxy processing concerning the print service of the NAN device 101. If the NAN device 102 is not executing the proxy processing, it registers the service information concerning the print service of the NAN device 101, and newly starts the proxy processing. On the other hand, if the NAN device 102 is already executing the proxy processing of the print service of the NAN device 101 and the contents remain the same, the NAN device 102 does not particularly change the service information (the contents of the proxy processing). Furthermore, if the contents of the service information have changed, for example, if the active period is extended/shortened, the NAN device 102 updates the service information. If the NAN device 101 requests to stop the proxy processing concerning the print service, the NAN device 102 confirms whether it is executing the proxy processing concerning the print service. If the NAN device 102 is executing the proxy processing, it stops the proxy processing concerning the print service. In this case, the NAN device 102 deletes the service information concerning the proxy processing of the print service. On the other hand, if the NAN device 102 is not executing the proxy processing concerning the print service of the NAN device 101, it does not change the registered contents of the proxy processing.

After that, the NAN device 102 determines whether all necessary changes to the contents of the proxy processing are normally complete (step S708). If the necessary changes are normally complete (YES in step S708), the NAN device 102 transmits, to the NAN device 101, a response message containing information indicating that the request has normally been accepted (step S709). The NAN device 102 can notify the user of these results (step S709). On the other hand, if any of the necessary changes to the contents of the proxy processing is not normally complete (NO in step S708), the NAN device 102 transmits, to the NAN device 101, a response message containing an error notification indicating that the request has not normally been accepted (step S710). The NAN device 102 can notify the user of these results (step S710). Note that the error notification may include information indicating a service whose acceptance has failed.

Note that the example in which the NAN device 102 starts the function as the proxy server in step S701, and then receives the message for requesting the proxy processing has been explained here. The present invention, however, is not limited to this, and the NAN device 102 may make a notification to the proxy client by adding, to the publish, information indicating that the proxy server can be executed in a state in which the function as the proxy server is not started. Thus, even before the function as the proxy server is started, the NAN device 102 can accept a proxy processing start request and the like. In response to acceptance of the proxy processing start request, the NAN device 102 can start the function as the proxy server. The NAN device 102 may accept a service information deletion request regardless of whether to execute the function as the proxy server.

By making the notification of the information concerning the proxy processing to the user in step S709, the user can recognize that, for example, the battery consumption of the apparatus of the user per unit time becomes high at the start of the proxy processing. By making the error notification in step S710, the user can recognize that, for example, the proxy processing intended by the user is not being executed. By further notifying the user of the reason of the error, the user can perform, for example, an operation removing the reason of the error. Note that by notifying the application for providing the image capturing function, the print function, or the like of the information about the NAN proxy processing in steps S709 and S710, the application can grasp the information about the NAN proxy processing. Therefore, the application can execute control in consideration of the status of the proxy processing.

Note that the proxy server may decrease the frequency at which it enters the DOZE state when the proxy processing is requested from the proxy client or when the proxy server accepts the request to execute the proxy processing. For example, before the proxy processing is requested, the proxy server may receive wireless signals during DW0, DW4, DW8, and DW12 and enter the DOZE state during the remaining DW periods, and after the proxy processing is requested, the proxy server may receive wireless signals during all the DW periods. This enables the proxy server to suppress power consumption while the proxy processing is not performed, and to sufficiently ensure, during the proxy processing, a period in which it proxy-transmits/receives signals.

Figure 8:
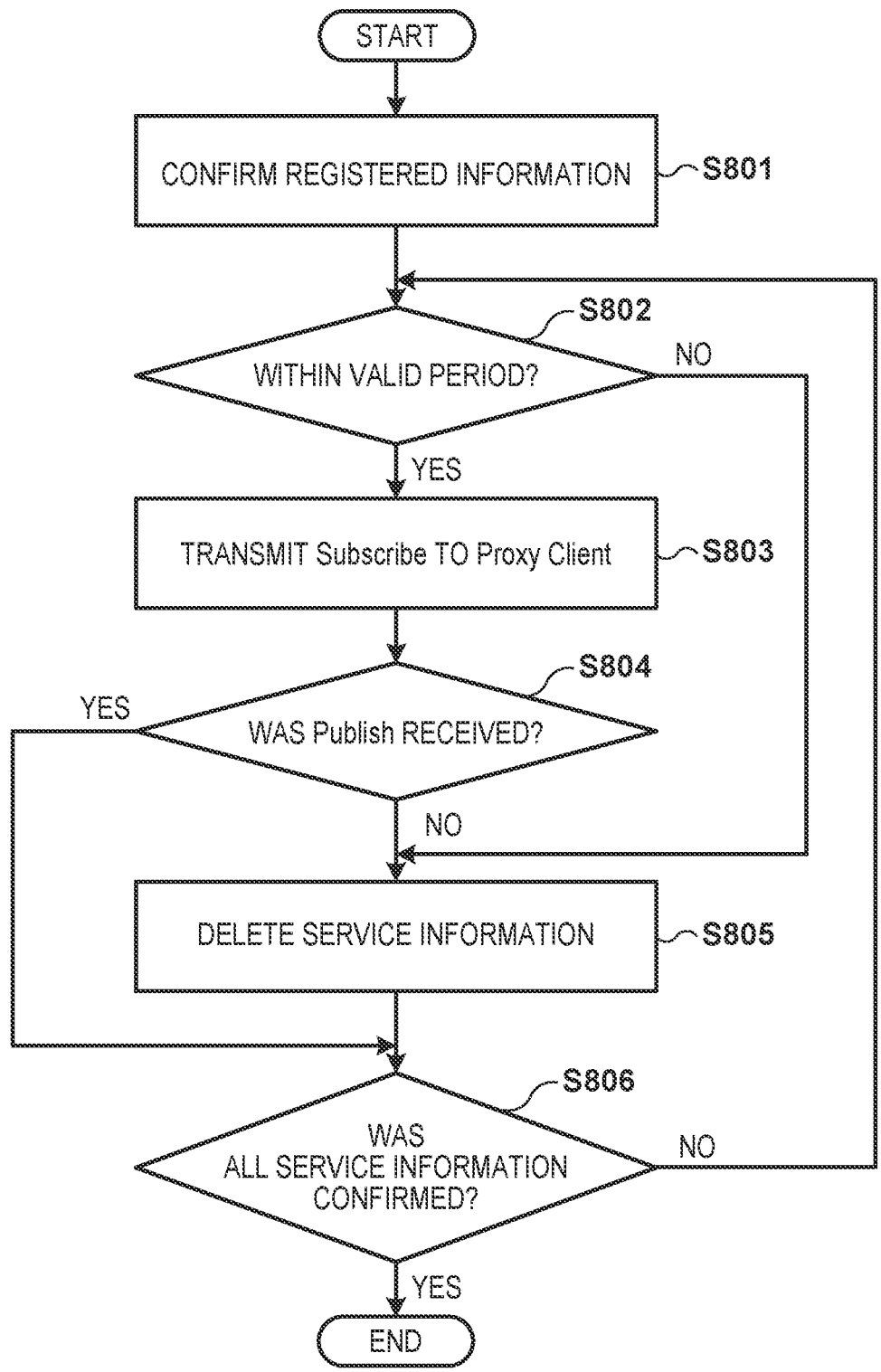
FIG. 8 is a flowchart implemented by the proxy server.

An example of the procedure of existence confirmation processing and information management processing along with it, both of which are executed by the NAN device 102 (for example, the existence confirmation processing unit 304) operating as the proxy server, will be described next with reference to FIG. 8. The processing shown in FIG. 8 starts when, for example, the user turns on the service proxy function of the NAN device 102, and is executed for, for example, every DW period. Note that the NAN device 102 can execute the processing shown in FIG. 8 when the control unit 202 reads out the program stored in the storage unit 201 and executes it. However, part or all of the processing shown in FIG. 8 may be implemented by, for example, hardware such as an ASIC.

The NAN device 102 confirms the registered service information in response to a request from the proxy client (NAN device 101) (step S801). If such service information exists, the NAN device 102 executes processes in steps S802 to S806 for each service. In step S802, the NAN device 102 confirms the active period of the registered service information (step S802). The NAN device 102 registers the active period based on, for example, Expiry Info in the proxy register request received from the proxy client, and can determine based on the registered information whether the service information is within the active period. Note that if the active period of the service information indicates an indefinite period or if there is no active period information, the NAN device 102 deals with the service information as information within the active period all the time. If the NAN device 102 determines whether the active period of the service information is expired (NO in step S802), the NAN device 102 deletes the service information (step S806).

On the other hand, if the active period of the service information is not expired (YES in step S802), the NAN device 102 transmits a subscribe to confirm the existence of the proxy client (NAN device 101) that has requested to register the service information (step S803). Note that if it is known that the proxy client as an existence confirmation target is in the DOZE state, the NAN device 102 may transmit a subscribe in step S803 during the DW period in which the proxy client is in the awake state. The NAN device 102 can specify the period in which the NAN device 101 is in the DOZE state from, for example, the subscribe for searching for the proxy server by the NAN device 101 or the proxy register request. If the NAN device 102 receives no publish from the proxy client to the subscribe transmitted during a given DW period, it can transmit the subscribe during a plurality of DW periods. For example, the NAN device 102 may transmit the subscribe during DW0 as the DW period in which all the NAN devices should be in the awake state. Then, the NAN device 102 waits for the publish from the proxy client, and determines whether it receives the publish (step S804). In step S804, for example, it is determined whether the publish is received while the subscribe is transmitted during a predetermined number (16 or less) of DW periods. That is, if the NAN device 102 receives no publish during a given DW period, it waits again for the publish during the next DW period while maintaining information indicating a state in which no publish has been received. Then, if the NAN device 102 has not received the publish a predetermined number of times (for example, once) or more during all the DW periods for a given period, it may obtain a determination result indicating that it has received no publish. This can prevent a situation in which when reception of the publish from the proxy client fails due to a radio wave status, the corresponding service information is unintentionally deleted to end the proxy processing. Furthermore, if, for example, the subscribe is transmitted during the DW period (for example, DW0) in which it is known that the proxy client is in the awake state, the NAN device 102 may determine whether the publish to the subscribe is received. Note that the NAN protocol permits transmission/reception of only the publish without transmitting the subscribe. Therefore, the processing in step S803 may be skipped.

If the NAN device 102 receives no publish (NO in step S804), it can determine that the proxy client that has requested to register the service information does not exist, and thus deletes the service information (step S805). Note that "the proxy client does not exist" indicates a state in which it is impossible to perform NAN communication due to movement of the proxy client to the outside of the communicable range of the NAN device 102, power supply disconnection, or the like. On the other hand, if the NAN device 102 receives the publish from the proxy client (YES in step S804), it can determine that the proxy client exists and continuously requests the proxy processing, and thus maintains the corresponding service information. By maintaining the service information, the proxy processing is continued.

After that, the NAN device 102 determines whether confirmation of all pieces of service information is complete (step S806). If the processing has not ended for all the pieces of service information (NO in step S806), the NAN device 102 returns the process to step S802; otherwise (YES in step S806), the NAN device 102 ends the processing.

Note that the NAN device 102 need not transmit the subscribe in step S803 during the DW period in which it is known that the target proxy client is in the DOZE state. In this case, during the DW period in which the proxy client is in the DOZE state, the processes in steps S803 to S805 need not be performed for the service information which the proxy client has requested to register. Note that the proxy client can notify, by the proxy registration request, the proxy server of the period in which the proxy client is in the awake state.

As described above, the NAN device functioning as the proxy server according to this embodiment executes existence confirmation of the NAN device functioning as the proxy client based on at least the active period of the service information. This enables the NAN device functioning as the proxy server to grasp a status in which the proxy processing should be aborted because, for example, the proxy client leaves the communicable range of the self-apparatus. This prevents the NAN device functioning as the proxy server from unnecessarily continuing the proxy processing, and also eliminates the necessity of unnecessarily, continuously holding the service information, thereby making it possible to suppress the necessary memory capacity.

Note that the example in which the active period information (Expiry Info) is contained in the proxy register request has been described above. The present invention, however, is not limited to this. For example, the active period information may be preset in the subscribe to be transmitted by the NAN device 101. A predetermined signal containing the active period information may be transmitted from the NAN device 101 to the NAN device 102 after the proxy register request. The proxy client can notify the proxy server of extension of the active period before the notified active period is expired. In this case, the proxy client additionally transmits, to the proxy server, active period information in which a new active period is set. Upon receiving the information, the proxy server updates the registered active period information.

The example in which the NAN device 102 operating as the proxy server transmits the subscribe as the existence confirmation processing has been described above. The present invention, however, is not limited to this. That is, during a period in which the NAN device 101 is in the awake state, the NAN device 102 may transmit an arbitrary message which needs some response. The NAN device 102 may wait for an arbitrary message transmitted when the NAN device 101 enters the awake state, without transmitting the subscribe from the self-apparatus. For example, the NAN device 101 can be configured to transmit the subscribe or the publish when it enters the awake state while making the NAN device 102 execute the proxy processing. This eliminates the necessity of transmitting the subscribe for existence confirmation by the NAN device 101, thereby making it possible to suppress the power consumption of the NAN device 101.

Other Embodiments

The present invention can be implemented by processing of supplying a program for implementing one or more functions of the above-described embodiment to a system or apparatus via a network or storage medium, and causing one or more processors in the computer of the system or apparatus to read out and execute the program. The present invention can also be implemented by a circuit (for example, an ASIC) for implementing one or more functions.

The present invention is not limited to the above-described embodiments, and various changes and modifications can be made within the spirit and scope of the present invention. Therefore, to apprise the public of the scope of the present invention, the following claims are made.

According to the present invention, it is possible to prevent a device that executes proxy processing from unnecessarily continuing the proxy processing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A proxy apparatus capable of executing proxy processing of at least one of transmission of information of a service provided by a communication apparatus and a search for a service provided by another apparatus for the communication apparatus, comprising:
   one or more processors; and
   one or more memories that stores a computer-readable instruction for causing, when executed by the one or more processors, the one or more processors to function as:
   an acceptance unit configured to accept, from the communication apparatus, a request for execution of a proxy processing, based on communication complying with a NAN (Neighbor Awareness Networking) standard;
   an execution unit configured to execute the proxy processing for the communication apparatus based on the request; and
   a confirmation unit configured to confirm, based on a response from the communication apparatus that is a response to a frame compliant with the NAN standard and having been transmitted by the proxy apparatus, whether the communication apparatus can communicate with the proxy apparatus while the proxy apparatus is executing the proxy processing.

2. The proxy apparatus according to claim 1, wherein the acceptance unit accepts a signal for searching for the proxy apparatus by the communication apparatus, which contains information concerning at least one of a DW (Discovery Window) period in which the communication apparatus is in a DOZE state and a DW period in which the communication apparatus is in an awake state.

3. The proxy apparatus according to claim 1, wherein the confirmation unit does not execute the confirmation during a DW (Discovery Window) period in which the communication apparatus is in a DOZE state.

4. The proxy apparatus according to claim 1, wherein if it is not confirmed that the communication apparatus can communicate with the proxy apparatus, the execution unit ends the proxy processing.

5. The communication apparatus according to claim 1, wherein the acceptance unit accepts from the communication apparatus a message for the request, wherein the message contains information indicating an active period, and
   wherein the confirmation unit confirms, during the active period based on the communication complying with the NAN standard, whether the communication apparatus can communicate with the proxy apparatus while the proxy apparatus is executing the proxy processing.

6. The proxy apparatus according to claim 5, wherein the message further contains information concerning at least one of a first DW (Discovery Window) period in which the communication apparatus is in a DOZE state and a second DW period in which the communication apparatus is in an awake state.

7. The proxy apparatus according to claim 5, wherein the confirmation unit executes the confirmation by transmitting a subscribe message for a service search and receiving a publish message as a response from the communication apparatus during a third DW (Discovery Window) period included in the active period.

8. A communication apparatus comprising:
   one or more processors; and
   one or more memories that stores a computer-readable instruction for causing, when executed by the one or more processors, the one or more processors to function as:
   a request unit configured to request, using a message complying with a NAN (Neighbor Awareness Networking) standard, a proxy apparatus to execute proxy processing of at least one of transmission of information of a service provided by the communication apparatus and a search for a service provided by another apparatus for the communication apparatus; and
   a response unit configured to transmit a response to a frame compliant with the NAN standard and having transmitted from the proxy apparatus,
   wherein the response transmitted by the communication apparatus to the frame causes the proxy apparatus to confirm whether the communication apparatus can communicate with the proxy apparatus,
   wherein the message contains at least information concerning at least one of a first DW (Discovery Window) period in which the communication apparatus is in a DOZE state and a second DW period in which the communication apparatus is in an awake state, and
   wherein the frame is transmitted by the proxy apparatus in a period that is determined to be a DW in which the communication apparatus is in the awake state based on the information contained in the message.

9. The communication apparatus according to claim 8, wherein the message further contains information concerning at least one of a first DW period in which the communication apparatus is in a DOZE state and a second DW period in which the communication apparatus is in an awake state.

10. The communication apparatus according to claim 8, wherein the computer-readable instruction further causes, when executed by the one or more processors, the one or more processors to function as a transmission unit configured to transmit a signal for searching for the proxy apparatus, which contains information concerning at least one of a first DW period in which the communication apparatus is in a DOZE state and a second DW period in which the communication apparatus is in the awake state.

11. A control method executed by a proxy apparatus capable of executing proxy processing of at least one of transmission of information of a service provided by a communication apparatus and a search for a service provided by another apparatus for the communication apparatus, the method comprising:
accepting, from the communication apparatus, a request for execution of a proxy processing, based on communication complying with a NAN (Neighbor Awareness Networking) standard;
executing the proxy processing for the communication apparatus based on the request; and
confirming, based on a response from the communication apparatus that is a response to a frame compliant with the NAN standard and having been transmitted by the proxy apparatus, whether the communication apparatus can communicate with the proxy apparatus while the proxy apparatus is executing the proxy processing.

12. A control method executed by a communication apparatus, comprising:
requesting, using a message complying with a NAN (Neighbor Awareness Networking) standard, a proxy apparatus to execute proxy processing of at least one of transmission of information of a service provided by the communication apparatus and a search for a service provided by another apparatus for the communication apparatus; and
transmitting a response to a frame compliant with the NAN standard and having transmitted from the proxy apparatus,
wherein the response transmitted by the communication apparatus to the frame causes the proxy apparatus to confirm whether the communication apparatus can communicate with the proxy apparatus,
wherein the message contains at least information concerning at least one of a first DW (Discovery Window) period in which the communication apparatus is in a DOZE state and a second DW period in which the communication apparatus is in an awake state, and
wherein the frame is transmitted by the proxy apparatus in a period that is determined to be a DW in which the communication apparatus is in the awake state based on the information contained in the message.

13. A non-transitory computer-readable storage medium that stores a program for causing a computer included in a proxy apparatus, which is capable of executing proxy processing of at least one of transmission of information of a service provided by a communication apparatus and a search for a service provided by another apparatus for the communication apparatus, to:
accept, from the communication apparatus, a request for execution of a proxy processing, based on communication complying with a NAN (Neighbor Awareness Networking) standard;
execute the proxy processing for the communication apparatus based on the request; and
confirm, based on a response from the communication apparatus that is a response to a frame compliant with the NAN standard and having been transmitted by the proxy apparatus, whether the communication apparatus can communicate with the proxy apparatus while the proxy apparatus is executing the proxy processing.

14. A non-transitory computer-readable storage medium that stores a program for causing a computer included in a communication apparatus to:
request, using a message complying with a NAN (Neighbor Awareness Networking) standard, a proxy apparatus to execute proxy processing of at least one of transmission of information of a service provided by the communication apparatus and a search for a service provided by another apparatus for the communication apparatus; and
transmit a response to a frame compliant with the NAN standard and having transmitted from the proxy apparatus,
wherein the response transmitted by the communication apparatus to the frame causes the proxy apparatus to confirm whether the communication apparatus can communicate with the proxy apparatus,
wherein the message contains at least information concerning at least one of a first DW (Discovery Window) period in which the communication apparatus is in a DOZE state and a second DW period in which the communication apparatus is in an awake state, and
wherein the frame is transmitted by the proxy apparatus in a period that is determined to be a DW in which the communication apparatus is in the awake state based on the information contained in the message.

15. A proxy apparatus capable of executing proxy processing of at least one of transmission of information of a service provided by a communication apparatus and a search for a service provided by another apparatus for the communication apparatus, comprising:
one or more processors; and
one or more memories that stores a computer-readable instruction for causing, when executed by the one or more processors, the one or more processors to function as:
an acceptance unit configured to accept, from the communication apparatus, a request for execution of a proxy processing, based on communication complying with a NAN (Neighbor Awareness Networking) standard;
an execution unit configured to execute the proxy processing for the communication apparatus based on the request; and
a confirmation unit configured to confirm, based on the communication complying with the NAN standard, whether the communication apparatus can communicate with the proxy apparatus while the proxy apparatus is executing the proxy processing,
wherein the confirmation unit does not execute the confirmation during a DW (Discovery Window) period in which the communication apparatus is in a DOZE state.

16. The proxy apparatus according to claim 15, wherein the acceptance unit accepts from the communication apparatus a message for the request, wherein the message contains information indicating an active period, and
wherein the confirmation unit confirms, during the active period, whether the communication apparatus can communicate with the proxy apparatus while the proxy apparatus is executing the proxy processing.

17. The proxy apparatus according to claim 16, wherein the confirmation unit executes the confirmation by transmitting a subscribe message for a service search and receiving a publish message as a response from the communication apparatus during a third DW period included in the active period.

18. The proxy apparatus according to claim 15, wherein the acceptance unit accepts a signal for searching for the proxy apparatus by the communication apparatus, which contains information concerning at least one of a DW period in which the communication apparatus is in a DOZE state and a DW period in which the communication apparatus is in an awake state.

19. The proxy apparatus according to claim 15, wherein if it is not confirmed that the communication apparatus can communicate with the proxy apparatus, the execution unit ends the proxy processing.

20. A proxy apparatus capable of executing proxy processing of at least one of transmission of information of a service provided by a communication apparatus and a search for a service provided by another apparatus for the communication apparatus, comprising:
one or more processors; and
one or more memories that stores a computer-readable instruction for causing, when executed by the one or more processors, the one or more processors to function as:
an acceptance unit configured to accept, from the communication apparatus, request for execution of a proxy processing and a message containing information concerning at least one of a first DW (Discovery Window) period in which the communication apparatus is in a DOZE state and a second DW period in which the communication apparatus is in an awake state, based on communication complying with a NAN (Neighbor Awareness Networking) standard;
an execution unit configured to execute the proxy processing for the communication apparatus based on the request; and
a confirmation unit configured to confirm whether the communication apparatus can communicate with the proxy apparatus based on transmission of a frame compliant with the NAN standard by the proxy apparatus to the communication apparatus, wherein the transmission is performed in a period that is determined based on the information contained in the message accepted by the acceptance unit to be a period in which the communication apparatus is in an awake state.

21. The proxy apparatus according to claim 20, wherein the acceptance unit accepts from the communication apparatus a message for the request, wherein the message contains information indicating an active period, and
wherein the confirmation unit confirms, during the active period, whether the communication apparatus can communicate with the proxy apparatus while the proxy apparatus is executing the proxy processing.

22. The proxy apparatus according to claim 21, wherein the confirmation unit executes the confirmation by transmitting a subscribe message for a service search and receiving a publish message as a response from the communication apparatus during a third DW period included in the active period.

23. The proxy apparatus according to claim 20, wherein the acceptance unit accepts a signal for searching for the proxy apparatus by the communication apparatus, which contains information concerning at least one of a DW period in which the communication apparatus is in a DOZE state and a DW period in which the communication apparatus is in an awake state.

24. The proxy apparatus according to claim 20, wherein the confirmation unit does not execute the confirmation during a DW period in which the communication apparatus is in a DOZE state.

25. The proxy apparatus according to claim 20, wherein if it is not confirmed that the communication apparatus can communicate with the proxy apparatus, the execution unit ends the proxy processing.

26. A control method executed by a proxy apparatus capable of executing proxy processing of at least one of transmission of information of a service provided by a communication apparatus and a search for a service provided by another apparatus for the communication apparatus, the method comprising:
accepting, from the communication apparatus, a request for execution of a proxy processing, based on communication complying with a NAN (Neighbor Awareness Networking) standard;
executing the proxy processing for the communication apparatus based on the request; and
confirming, based on the communication complying with the NAN standard, whether the communication apparatus can communicate with the proxy apparatus while the proxy apparatus is executing the proxy processing,
wherein the confirmation is not executed during a DW (Discovery Window) period in which the communication apparatus is in a DOZE state.

27. A non-transitory computer-readable storage medium that stores a program for causing a computer included in a proxy apparatus, which is capable of executing proxy processing of at least one of transmission of information of a service provided by a communication apparatus and a search for a service provided by another apparatus for the communication apparatus, to:
accept, from the communication apparatus, a request for execution of a proxy processing, based on communication complying with a NAN (Neighbor Awareness Networking) standard;
execute the proxy processing for the communication apparatus based on the request; and
confirm, based on the communication complying with the NAN standard, whether the communication apparatus can communicate with the proxy apparatus while the proxy apparatus is executing the proxy processing,
wherein the confirmation is not executed during a DW (Discovery Window) period in which the communication apparatus is in a DOZE state.

28. A control method executed by a proxy apparatus capable of executing proxy processing of at least one of transmission of information of a service provided by a communication apparatus and a search for a service provided by another apparatus for the communication apparatus, the method comprising:
accepting, from the communication apparatus, request for execution of a proxy processing and a message containing information concerning at least one of a first DW period in which the communication apparatus is in a DOZE state and a second DW period in which the communication apparatus is in an awake state, based on communication complying with a NAN (Neighbor Awareness Networking) standard;
executing the proxy processing for the communication apparatus based on the request; and
confirming whether the communication apparatus can communicate with the proxy apparatus based on transmission of a frame compliant with the NAN standard by the proxy apparatus to the communication apparatus, wherein the transmission is performed in a period that is determined based on the information contained in the accepted message to be a period in which the communication apparatus is in an awake state.

29. A non-transitory computer-readable storage medium that stores a program for causing a computer included in a proxy apparatus, which is capable of executing proxy processing of at least one of transmission of information of a service provided by a communication apparatus and a search for a service provided by another apparatus for the communication apparatus, to:

accept, from the communication apparatus, request for execution of a proxy processing and a message containing information concerning at least one of a first DW period in which the communication apparatus is in a DOZE state and a second DW period in which the communication apparatus is in an awake state, based on communication complying with a NAN (Neighbor Awareness Networking) standard;

execute the proxy processing for the communication apparatus based on the request; and confirm whether the communication apparatus can communicate with the proxy apparatus based on transmission of a frame compliant with the NAN standard by the proxy apparatus to the communication apparatus, wherein the transmission is performed in a period that is determined based on the information contained in the accepted message to be a period in which the communication apparatus is in an awake state.

* * * * *